March 21, 1961     H. S. HEMSTREET     2,975,670
METHOD AND APPARATUS FOR PRODUCING VISUAL DISPLAY
Filed April 22, 1955     4 Sheets-Sheet 1

HAROLD S. HEMSTREET
INVENTOR

BY Richard G. Stephens
ATTORNEY

March 21, 1961 H. S. HEMSTREET 2,975,670
METHOD AND APPARATUS FOR PRODUCING VISUAL DISPLAY
Filed April 22, 1955 4 Sheets-Sheet 2

HAROLD S. HEMSTREET
INVENTOR

BY Richard G. Stephens
ATTORNEY

HAROLD S. HEMSTREET
INVENTOR

BY *Richard D. Stephens*

ATTORNEY

March 21, 1961  H. S. HEMSTREET  2,975,670
METHOD AND APPARATUS FOR PRODUCING VISUAL DISPLAY
Filed April 22, 1955  4 Sheets-Sheet 4
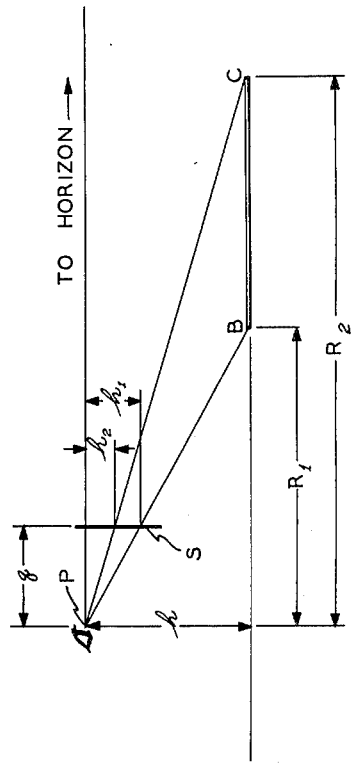
FIG. 10
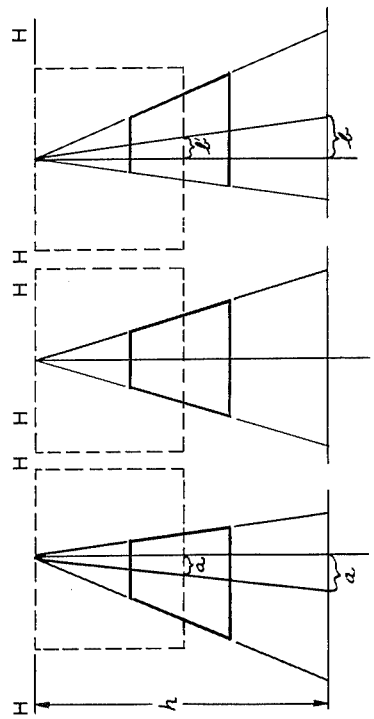
FIG. 9c
FIG. 9a
FIG. 9b
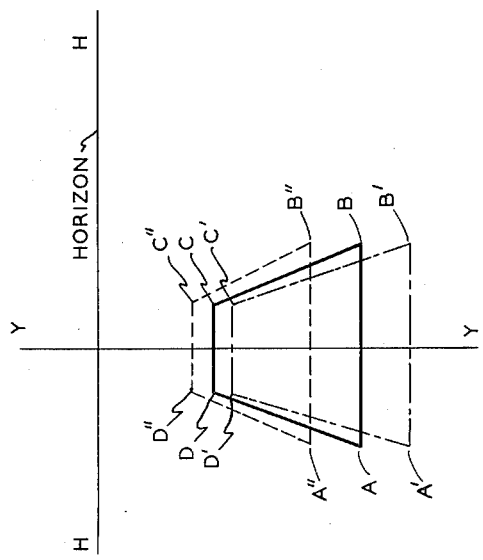
FIG. 8
HAROLD S. HEMSTREET
INVENTOR
BY Richard G. Stephens
ATTORNEY United States Patent Office 2,975,670
Patented Mar. 21, 1961

2,975,670

METHOD AND APPARATUS FOR PRODUCING VISUAL DISPLAY

Harold S. Hemstreet, Binghamton, N.Y., assignor to General Precision, Inc., a corporation of Delaware Filed Apr. 22, 1955, Ser. No. 503,211

18 Claims. (Cl. 88—24)

This invention relates to improved method and apparatus for producing visual displays simulating areas as seen from selected viewpoints from objects having the appearance of said areas as seen from other viewpoints. The instant invention is a continuation-in-part of my copending application Serial Number 480,033, filed January 5, 1955 entitled "Visual Display Method and Apparatus" and my copending application Serial Number 500,325, filed April 11, 1955 for "Simulated Viewpoint Displacement Method and Apparatus." The two above mentioned copending applications illustrate method and apparatus for producing visual displays of the above mentioned type and illustrate in specific embodiments of the invention apparatus especially suitable for the production of displays in conjunction with grounded aircraft trainers. In preferred embodiments of said inventions motion pictures made from an aircraft during an actual flight or motion pictures made while moving a camera relative to a miniature ground scene are projected for observation by a pilot in a stationary grounded trainer, and the images from the motion picture film are "distorted," or altered in apparent perspective in accordance with deviations of the simulated course "flown" by the grounded trainer from the course along which the pictures were taken to provide realistic ground scenes for use in the training of pilots.

The phrase "altering the apparent perspective of an image" is used to designate specifically the process which enables one to modify an image projected from a film, for example, for observation from an observer's station, where the film was made with a camera located at a given position, to provide a perspectively correct image which, when viewed from the same observer's station, would simulate the same scene as it would appear when viewed from a different position, a position where the camera was not located when the film was exposed. Proper modification of the film image to provide a modified image which is perspectively correct for the new simulated position or viewpoint involves several complex transformations to be mentioned below. The phrase "altering the apparent perspective" as used in this application contemplates that an image which is perspectively correct or realistic for a first viewpoint be modified to make the image perspectively correct or realistic for a second viewpoint which is different from and displaced from the first viewpoint. Optical systems which merely correct keystone distortion, alter focusing, change aspect ratio, or bodily shift or re-direct an image without nonuniformly magnifying it do not in any way "alter the apparent perspective," but merely aid in making an image which may be perspectively incorrect for any or all viewpoints more properly an image which is perspectively correct to represent a scene as it appears from a single viewpoint, usually the location of the camera when the film was exposed. In copending application Serial Number 480,033, filed January 5, 1955 there are shown independent optical distorting means (a rotatable prism and a variable power anamorphoser) which distort the projected images in accordance with lateral displacement and altitude displacement of the selected viewpoint (simulated position of aircraft) from a reference viewpoint from which a given picture or film frame was taken. By rotating the wedge and varying the magnification of the anamorphoser in accordance with the deviation of the simulated course flown by the trainer from the reference path along which the pictures were taken the projected image is appropriately "sheared" in a lateral direction and stretched or compressed in a vertical direction to provide an image having the perspective of the scene viewed along the simulated course. In copending application Serial Number 500,325 of April 11, 1955 there are shown in a preferred embodiment of the invention cooperative optical distorting means (a pair of variable power anamorphosers aligned with and rotatable together about the projector optical axis with their axes of variable magnification acting mutually perpendicularly) which produce the required distortion to simulate viewpoint displacement. By varying the magnification of each of the anamorphosers, rotating the pair about the system axis and rotating the motion picture film (or other object) about the system optical axis the required distorted images may be obtained.

Any large grounded area viewed or photographed has its horizon or vanishing point optically located at an infinite distance relative to the eye of the observer or the camera, and as the observer's viewpoint is displaced, objects in the scene viewed or picture taken which are located at the horizon do not appear in a different direction to the observer and remain in the same location on the camera film. Foreground objects, however, are displaced considerably both in the field of view of the observer or on a camera film as the viewpoint is moved, and as will be explained below, such displacement is proportional to the distance of such objects from the horizon or vanishing point. If the film to be used with the rotatable prism-variable anamorphoser apparatus of application Serial Number 480,033 is taken with the camera maintained pointed toward the horizon and the film images are projected at the same angle through the distorting apparatus, the resulting distortion will be, as required, proportional to the distance of each portion of the picture from the horizon. If the film to be used with the crossed anamorphoser system is taken with the camera axis directed toward the horizon and projected with the horizon portions of each picture aligned with the axis of the crossed anamorphosers, the resultant distortion will be exactly that required, although the image will require a certain axial rotation to be properly aligned on a screen. However, in making films for producing displays of outdoor scenes (such, for example, as areas seen during a landing approach of an aircraft to an airstrip) it may be undesirable to maintain the camera axis pointed toward the horizon while the pictures are taken, since half of the resulting pictures will show "sky." Since sky is usually uniform in color and homogeneous, negligible change in appearance of an area of sky results from displacing the viewpoint from which said area is seen, and hence the photographing of and projection of large amounts of sky area results in a waste of half of the angular field of the system. Furthermore, an acceptable sky display may be easily and economically produced without complex equipment by merely projecting light through a blue or grey translucent glass. It therefore becomes desirable to provide method and means by which the major portion or entire angular field of the system may be used to project images of grounded area. The instant invention provides method and means by which the foregoing may be accomplished.

It is therefore a primary object of the invention to provide method and means for providing a visual display in which a projected scene may be properly located on a viewing surface so as to provide a realistic display to a substantially stationary observer.

It is a further object of my invention to provide improved method and apparatus useful in properly locating a projected scene on a viewing surface as the image providing said scene is distorted to provide realistic change in apparent perspective.

It is an additional object of the invention to provide improved means for altering the apparent perspective of optical images to provide realistic visual displays.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

Fig. 8 is a geometrical diagram illustrating the appearance in perspective of a rectangular grounded surface at various altitudes; and Figs. 9a, 9b, 9c are geometrical diagrams illustrating the appearance in perspective of a rectangular grounded surface at various lateral positions.

Figure 1:
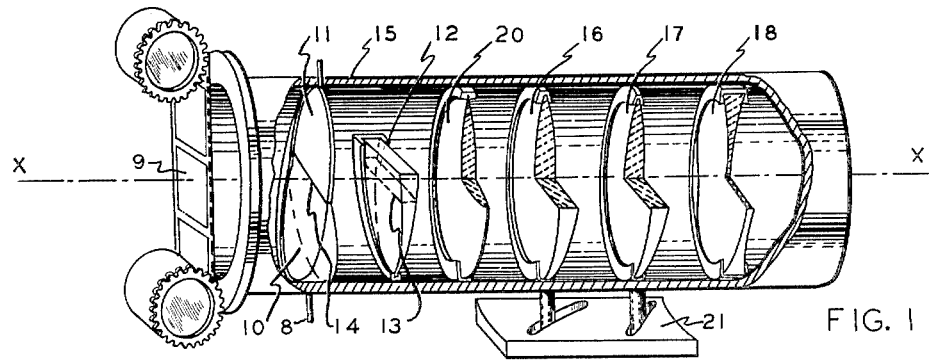
Fig. 1 illustrates a specific optical image distorting means of the type described in detail in my copending application Serial Number 480,033.

As an aid in understanding the nature of the distortion provided to vary the apparent perspective of a projected image, reference may be had to Fig. 8. Shown in heavy lines is a trapezoid ABCDA, which is the shape a rectangular grounded surface might present to an observer located at some distance away from the surface on the centerline Y—Y of the surface and at some altitude above the surface. Line H—H represents the horizon, and it will be appreciated that parallel lines viewed in perspective appear to converge at the horizon, so that if surface ABCDA were of infinite length in the Y—Y direction sides DA and BC of the surface would converge at the horizon. If the altitude of the observer's viewpoint were to increase a certain amount, the surface would appear to have the shape of trapezoid A'B'C'D'A', and conversely, if the altitude of the observer's viewpoint were to decrease, the surface would appear to have the shape of trapezoid A"B"C"D"A". If a picture were made at the initial altitude and then projected onto a suitable screen with no distortion, the picture viewed on the screen would show the rectangular surface with a shape having the same proportions as trapezoid ABCDA. It will now be apparent that if a picture taken at the initial altitude could be distorted properly, that the projected scene viewed would simulate realistically that which would be seen at various other altitudes.

Since the sides of each of the trapezoids shown in Fig. 8 converge at the horizon, and since the base width of all the trapezoids remains the same, it may be appreciated that the required distortion of an image to simulate an image of another altitude consists of stretching or squeezing the image vertically with respect to the horizon. This may also be understood by reference to Fig. 10. If an observer located at point P views the grounded surface (having side BC) at an altitude $h$, a realistic simulation of the scene viewed may be provided by projecting a picture taken from point P onto a screen S. It may be seen that the distances of objects below the horizon line on the screen must be inversely proportional to the horizontal distance between those points and the ground position of the viewpoint. For example, the distance $h_1$ on the screen between the horizon and the near end B of the grounded surface is inversely proportional to $R_1$, the horizontal distance between viewpoint P and the actual near end B of the grounded surface, or as may be seen by similar triangles:

$$h_1 = h\frac{q}{R_1}$$

where $q$ is the distance between the observer and screen S.

Similarly, the distance $h_2$ on the screen between the horizon and the far end C of the surface is inversely proportional to $R_2$, the horizontal distance between viewpoint P and the far end C of the surface, or:

$$h_2 = h\frac{q}{R_2}$$

Shown in Figs. 9a, 9b and 9c are similar geometrical diagrams representing the change in appearance of a rectangular grounded surface incident to lateral variation of the observer's viewpoint. In Fig. 9a the observer is located directly above the extended centerline of the rectangular surface. If the viewpoint is now moved a given distance to the right, the surface will have an apparent shape such as shown in Fig. 9b in heavy lines, and conversely, if the viewpoint is moved to the left, the surface will have an apparent shape such as shown in heavy lines in Fig. 9c. It will now become apparent that if a picture taken from the centerline were projected onto a screen with suitable distortion, that the scene viewed on the screen might realistically simulate the scene viewed from various lateral positions. Superimposed on each of Figs. 9a, 9b and 9c in dashed lines are rectangles representing one frame of a motion picture which might be used to project the scene viewed. It may be seen from similar triangles that the displacements $a'$ and $b'$ of the centerline of the grounded surface from the center of the film are proportional to the ratio of the lateral displacement of the viewpoint to the altitude at which the film was taken. If the film were taken so that the horizon portion of the picture lay at the upper edge of the film frame, then the lateral displacement of the picture at any point is proportional to the distance from that point to the top of the frame. If the actual optical system utilized causes an inversion of the image, it will be apparent that the "top" and "bottom" of the film frame are correspondingly reversed in the above analysis. Thus it may now be apparent that by providing distortion of an image varying linearly from zero at the portion of the image representing the horizon to maximum distortion at a nearest location, that a scene simulating that which would be seen from various laterally displaced viewpoints may be provided.

Shown in Fig. 1 is a specific embodiment of optical distorting means which is disclosed and explained in detail in copending application Ser. No. 480,033. Provided to accomplish the required "shearing" or distortion of an image to simulate lateral viewpoint displacement is a wedge or prism 10 which is rotatable about a vertical axis by means of shaft 8. An oppositely tapered fixed wedge 12 compensates for unwanted vertical distortion of the image caused by rotatable wedge 10. If an image of a grounded area such as that viewed between a foreground point and the horizon is contained on inverted film 9 and is projected through wedges 10 and 12, the image will be unaffected in a vertical sense, but will be distorted laterally or "sheared" an amount depending upon the angular position of rotatable wedge 10. This type of lateral displacement or distortion of an image is termed "shear" distortion since it is analogous to the deformation produced by applying pure shear forces to an elastic member. The amount which any portion of the image will be laterally displaced at any given angle of rotation of prism 10 will be seen to depend upon its distance from edge 14 of prism 10, there being practically no displacement at the thin edge of prism 10. If images of such grounded areas are projected with the horizon portion of the image striking edge 14, the lateral or shear distortion imposed upon the image will vary linearly from zero distortion at the horizon portion to maximum distortion at the foreground portion of the image, which is the exact type of image distortion required to simulate lateral displacement of a viewpoint.

For the purpose of providing the vertical expansion or compression of a projected image to simulate vertical displacement of the viewpoint, a variable power anamorphoser is provided. The variable anamorphoser lens combination may comprise, for example, a pair of axially movable positive cylindrical lenses 16, 17 and a fixed negative cylindrical lens 18. By shifting the positive lenses 16, 17 axially in correct amounts as by means of cam block 21, the vertical magnification of the combination may be varied while maintaining the projected image in focus on the projection screen or other viewing surface. Cam block 21 may comprise a sleeve rotatable about lens barrel 15, so that rotation of the cam block moves lenses 16, 17 along longitudinal slots cut in lens barrel 15. A conventional projection lens 20 may also be provided to focus the resultant image on the screen. As the detailed operation of the precise form of variable anamorphic lens combination is set forth in detail in application Serial No. 480,033 and since the precise anamorphoser lens combination is not an essential feature of the present invention no detailed explanation of its operation need be set forth herein. Thus by providing a film image having its horizon aligned upon the optical axis X—X of the distortion means of Fig. 1 (i.e. aligned so as to touch the edge 14 of wedge 10, surface 13 of wedge 12 and the centers of spherical projection lens 20, positive cylindrical lenses 16, 17 and negative cylindrical lens 18) the image will be properly distorted. However, if the horizon portion of the film image is aligned along the optical axis X—X, it will be seen that half of the film image will have to contain "sky" area, resulting in a waste of half of the field of the system as mentioned above. Rotatable prism 10 may carry an opaque mask 11, since only the portions of the image passing through the prism itself will be properly displaced laterally. Since some light passing through prism 10 will be deflected upwardly across the system axis, stationary compensation wedge 12 extends some distance above the axis.

Figure 2:
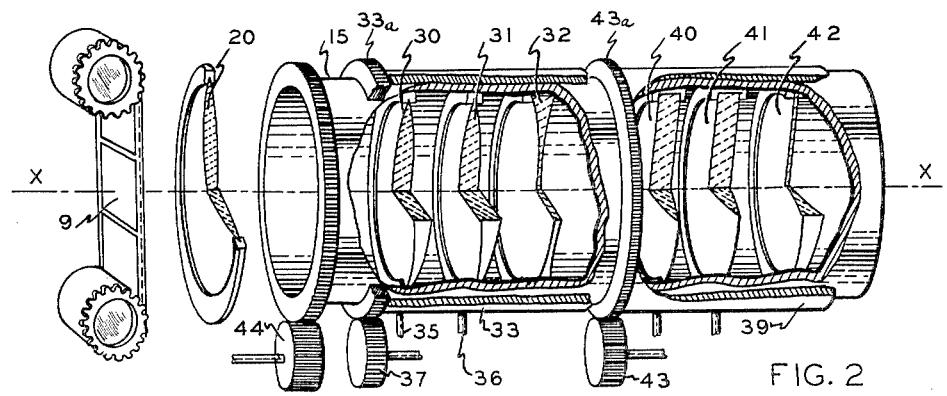
Fig. 2 illustrates a specific optical image distorting means of the type described in detail in my copending application Serial Numer 500,325.

Shown in Fig. 2 is a specific embodiment of improved optical distorting means which is disclosed and explained in detail in my copending application Serial Number 500,325, filed on April 11, 1955. This improved distorting means may comprise a pair of mutually perpendicular variable power anamorphic lens combinations which are rotatable axially with respect to the film or other objects. By varying the power of the anamorphic combinations and their angular orientation with respect to the object an image having the correct "distortion," or apparent perspective, may be provided. Such image will be axially rotated with respect to the observer, however, and to correct the image so that the horizon remains level it is necessary to rotate axially the entire projection system relative to the observer, or to rotate the image with respect to the projection system. The ability of such a distorting means to provide the required apparent perspective is disclosed and explained in detail in said application Serial Number 500,325, entitled "Simulated Viewpoint Displacement Method and Apparatus," and since the precise form of distorting means is not an essential feature of the present invention, a detailed explanation of its operation need not be repeated herein. Described briefly the distorting means may be mounted in front of a conventional spherical projection lens 20, and may comprise, for example, a first variable power anamorphic lens combination comprised of positive cylindrical lenses 30, 31 and a negative cylindrical lens 32, and a second variable power anamorphic combination comprised of lenses 40, 41 and 42. Cam slots cut in sleeve 33 may engage cam follower pins 35, 36 which carry lenses 30, 31 so that rotation of sleeve 33 by means of toothed flange 33a of sleeve 33 and pinion 37 will axially move lenses 30 and 31 with respect to lens 32, while straight axial slots in barrel 15 prevent rotation of the lenses within the barrel. Positive cylindrical lenses 40, 41 and negative cylindrical lens 42 are mounted rotated 90 degrees with respect to the first anamorphic combination, so that the axes of variable magnification of the two variable anamorphosers are mutually perpendicular. Positive lenses 40 and 41 may be moved axially with respect to lens 42 by rotation of toothed portion 43a of sleeve 39 by means of pinion 43. The entire distorting means may be rotated with respect to object 9 as by rotation of lens barrel 15 by means of pinion 44. The means utilized to rotate pinions 37 and 43 may be carried with lens barrel 15, so that rotation of pinion 44 does not disturb the magnification of either anamorphoser.

As mentioned above both vertical and lateral distortion of the image must be done with reference to the horizon, or in other words, with the distortion in each dimension of the image zero at the horizon. It will now become apparent that if the distorting means of Fig. 2 is used with the horizon or vanishing portion of the image of film 9 aligned to pass through the optical axis X—X that the required distortion of the ground area image will result, but that again one half of the image will be wasted since it will contain "sky" area.

Figure 4:
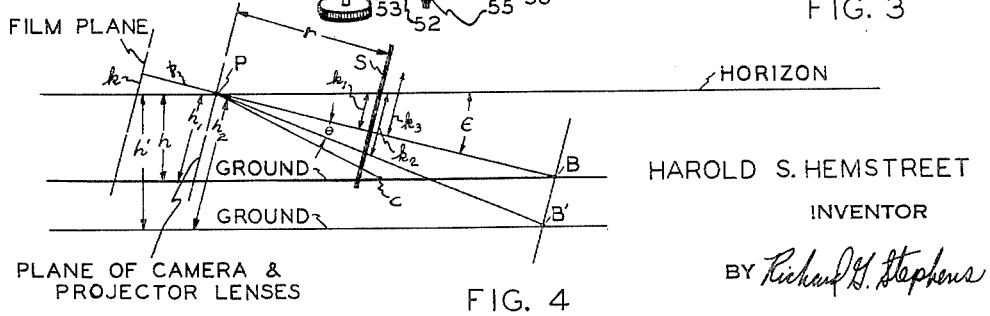
Fig. 4 is a geometrical diagram useful in understanding the unwanted vertical shifting obtained by image distortion apparatus as alteration of apparent perspective is obtained.

Referring now to Fig. 4, assume an observer located at point P an altitude $h_1$ above the ground looks along line PB and views the area between a point C located on the ground and the horizon. It will be seen that the area viewed between the horizon and point B on the ground may be simulated by taking a picture of the area and projecting the film (having an image $k$ of said area) through a projection lens at point P onto a screen S. Such an area properly would have a height $k_1$ on screen S. Now assume that the observer is moved upwardly to a new altitude $h_2$ above the ground, or if the observer is stationary as in a stationary grounded trainer, that the ground moves downwardly, to put the observer at a new altitude $h_2$. It will be seen that the scene viewed may be simulated by projection of an image (having a height $k_2$ and a location as shown) downwardly at an angle $\epsilon$ from the horizontal onto screen S. The $k_2$ image will be seen to contain the same picture information as the $k_1$ image, but will be magnified. If the film has been taken with the camera axis pointed along the horizon and is projected with the projector axis lying along the horizon it will be seen that mere magnification will properly distort the film image from a $k_1$ size to a $k_2$ size. Since that portion of the image representing the horizon would lie on the optical axis of the projection system, it will not be displaced as the vertical magnification of the projection system is increased.

Now assume instead that the picture was taken from altitude $h_1$ with the camera pointed along line PB and then projected perpendicularly onto screen S with the projector axis lying along line PB. It will be apparent that the $k_1$ image will be properly placed on the screen. However, as the vertical angular magnification is increased to provide a $k_2$ image in simulation of an increase in altitude, it will be seen that the portion of the image lying along line PB will not be displaced, but the portion of the image representing the horizon will be moved upwardly to provide an image such as $k_3$ on screen S. In this connection it should be recalled that in any optical system using coaxial cylindrical or spherical lenses that light passing through the optical axis of the system is undeviated. Thus proper change in magnification to alter the apparent perspective of the projected picture causes an unwanted vertical shifting of the image if the optical axis is not aligned with the horizon. The amount which the $k_3$ image is displaced from the $k_2$ image may be seen to be directly proportional to the distance between points B and B', which in turn is directly proportional to the difference between altitudes $h_1$ and $h_2$. If the angle between projection line PB and the horizon is denominated $\epsilon$ and the distance along the optical axis from projection point P to screen S is denominated $r$, it may be seen that image $k_3$ may be moved downwardly by rotating the projector clockwise as viewed in Fig. 4 about a horizontal axis through its lens plane through an angle $\theta$ proportional to:

$$\theta \alpha \frac{k_2 - k_1}{r}$$

Since by inspection $$r = \frac{k_1}{\tan \epsilon}$$

$$\theta \alpha \left(\frac{k_2 - k_1}{k_1}\right)(\tan \epsilon) \alpha \left(\frac{h_2 - h_1}{h_1}\right) \tan \epsilon$$

Thus it may be seen that by rotating the projector through the angle $\theta$ as the distortion is varied, the unwanted vertical shifting obtained as an incident to the image distortion may be cancelled, so that the horizon portions of the projected image remain in place on the screen as desired. It will also become apparent that the $k_3$ image may be shifted downwardly by moving the film upwardly in its own plane (in projectors which invert the image). The distance which the film must be shifted in its own plane to compensate for the undesired vertical shifting depends upon the focal length of the projector, and may be expressed as:

$$\left(\frac{h_2 - h_1}{h_1}\right) p \tan \epsilon$$

where $p$ equals the focal length of the projector optics.

By similar analysis it may be shown that an undesired lateral shifting occurs when the optical axes are not aligned with the horizon. By means of the invention this shifting may be compensated for by rotating the projector about a vertical axis through the projector lens, or by shifting the film laterally in its own plane. The rotation of the projector required may be expressed in radians as $d/h_2 \tan \epsilon$, and the required film shift may be expressed as $pd/h_2 \tan \epsilon$, and where $d$ is the lateral displacement of the viewpoint within the film plane.

Figure 3:
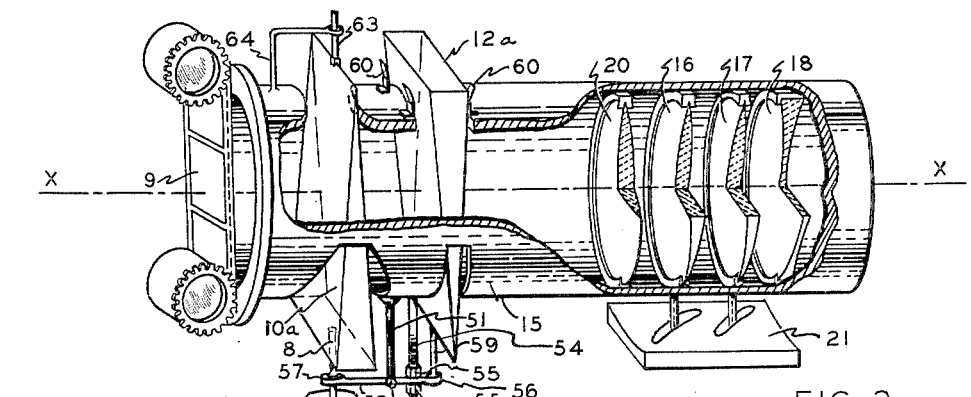
Fig. 3 illustrates a specific optical image distortion apparatus of the same general type as that shown in Fig. 1, but in which certain modifications have been made to utilize the apparatus of Fig. 3 in practicing the present invention.

Both the crossed variable anamorphoser distorting apparatus of Fig. 2 and the rotatable prism-variable anamorphoser apparatus of Fig. 1 may be used in accordance with the invention so that a major portion or all of the angular field is used to distort grounded area rather than sky area. The apparatus of Fig. 2 requires no physical modification for such use, but the apparatus of Fig. 1 requires modifications such as shown in Fig. 3. Displacement of the viewpoint causes no lateral displacement in a picture of things located at an infinite distance on the horizon, and rotatable prism 10 of Fig. 1 causes no lateral displacement of the projected film image as the prism rotates only at its "zero thickness" on knife edge 14. It will be seen then, that if the horizon is contained on the film image, that that portion of the image should be projected through the thin edge 14 of prism 10. If the pictures are taken with the camera pointed downwardly from the horizon so that little or no sky is photographed, then the edge 14 of prism 10 should be raised upwardly in Fig. 1 with respect to the inverted film 9. If the pictures are taken with the camera pointed downwardly at such an angle that no sky appears in the pictures, it will be apparent that prism 10 should be raised upwardly in such amount that its edge 14 would be aligned with the horizon portion of the picture if the picture were large enough to include the horizon. Thus it may be seen that by moving the rotatable prism upwardly as shown in Fig. 3, the apparatus of Fig. 1 may be modified so that it will provide the desired shear distortion even when the pictures are taken downwardly at such an angle that the system field encompasses no sky area.

In Fig. 3 post 51 rigidly affixed to lens barrel 15 pivotally carries at 52 lever 53. Post 54 rigidly affixed to barrel 15 is provided with a threaded portion passing through lever 53, so that the position at which nuts 55, 55 are tightened fixes the pivot position of lever 53. Carried on the extremities of lever 53 are pivoted connections 56 and 57. Connection 56 attaches to rod 59, which is rigidly attached to compensating wedge 12a, and may comprise, for example, a yoke or loose collar arranged to move wedge 12a vertically as lever 53 pivots about pivot point 52. Suitable slots in lens barrel 15 allow vertical movement of prism 12a, and leaf springs 60 discourage rotation or rattling of prism 12a. Connection 57 preferably comprises a yoke carrying a bearing in which a flanged portion of shaft 8 is journalled. As lever 53 pivots about pivot point 52, shaft 8 and rotatable prism 10a are raised or lowered. Regardless of the position of lever 53, shaft 8 and prism 10a are rotatable through a limited arc determined by the size of the slots cut in lens barrel 15 to accommodate prism 10a. Rotatable prism 10a may be supported at its upper end by means of shaft 63 and bearing arm 64, the latter being rigidly attached to lens barrel 15. Prisms 10a and 12a may be carried at equal lever arm distances from pivot point 52, so that movement of lever arm 53 lowers one prism a given distance while raising the other an equal distance. Since the two prisms have opposite tapers of the same degree, the apparatus automatically provides the required amount of vertical compensation by prism 12a as prism 10 is raised or lowered to enable the distorting apparatus to be used with pictures having different proportions of ground and sky area.

Figure 5:
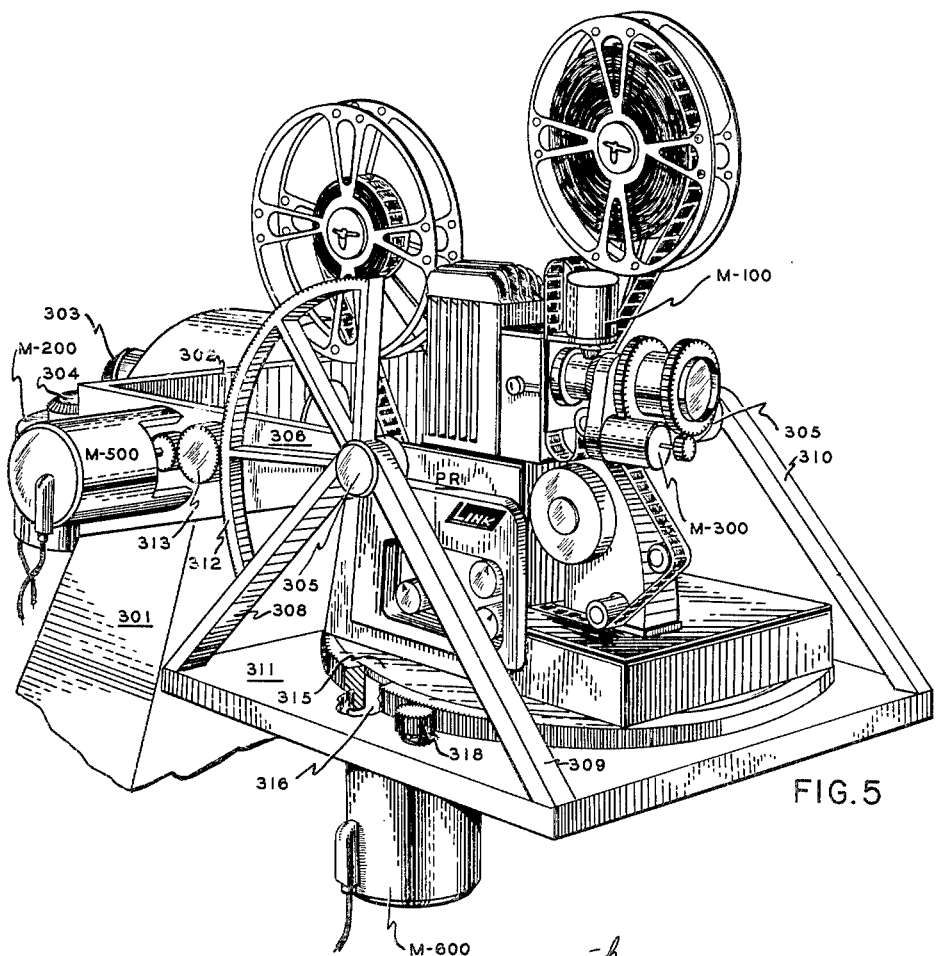
Fig. 5 shows a specific mechanical arrangement which may be utilized in practicing the present invention to tilt the projector.

Shown in Fig. 5 is an exemplary form of mechanism which may be utilized to rotate the projector in order to compensate for the undesired vertical and lateral shifting mentioned above. A stationary pedestal 301 has the neck of yoke 302 journalled in the upper portion of the pedestal, and bevel gear 303 is carried on the end of the neck of yoke 303. Servomotor M–200 drives bevel gear 304 which meshes with gear 303, thereby serving to rotate yoke 302 about the axis of the neck of yoke 302. In embodiments of the invention utilizing the crossed variable anamorphic system of application Serial Number 500,325 the rotation of the entire projector is used to compensate for an unwanted rotation of the image obtained as a result of properly distorting the image. No such undesired rotation is obtained using the rotatable prism-variable anamorphic system of application Serial No. 480,033, and hence in constructing apparatus in accordance with such latter invention servomotor M–200 need not be used, and yoke 302 may be rigidly attached to pedestal 301.

Carried at the extremities of arms 306, 307 (not shown) of yoke 302 are hubs such as 305, which are rotatably borne by means of shafts (not shown) and from which extend platform supporting arms such as 308, 309, and 310. Rigidly attached to arm 308 and hub 305 is gear segment 312. Servomotor M–500 is mounted on the arm of yoke 302 and drives gear segment 312 through gear 313, thereby rotating platform 311 about an axis passing through hubs 305. Platform 311, which is rolled and pitched as heretofore explained, carries a rotatable circulate plate 315, which is journalled in plate 311 as shown in a cutaway portion at 316, and the toothed flange of plate 315 is engaged by pinion 318. Servomotor M–600 is mounted below platform 311 and drives pinion 318 to rotate plate 315 about an axis coincident with the center of plate 315. Projector PR is carried on plate 315, and hence is rolled by operation of servomotor M–200, pitched by operation of servomotor M–500 and yawed by operation of servomotor M–600. The three axes of rotation of the projector may be mutually perpendicular and may intersect at the center of the projection lens of the projector. The projection lens will then remain the same distance from the projection screen utilized as it is rotated. A control system for automatically operating the shifting servomotors shown will be disclosed and explained in connection with Fig. 6. The distorting optical apparatus is carried on the front of the projector. Either the rotatable prism-variable anamorphoser apparatus of Fig. 3 or the crossed anamorphoser apparatus of Fig. 2 may be utilized with the projector tilting mechanism of Fig. 5. The distorting means shown in Fig. 5 is similar to the apparatus of Fig. 2, except that the toothed flanges of sleeves 33 and 39 (see Fig. 2) have been constructed on opposite ends of the sleeves to facilitate mounting of servomotors which vary the powers of the anamorphosers. Servomotor M–100 rotates the entire distorting system axially, servomotor M–300 varies the power of the second anamorphoser, and servomotor M–200 (not shown, but which is carried in the same manner as servomotor M–300 on the opposite side of the distorting apparatus) varies the power of the first anamorphoser.

Figure 6:
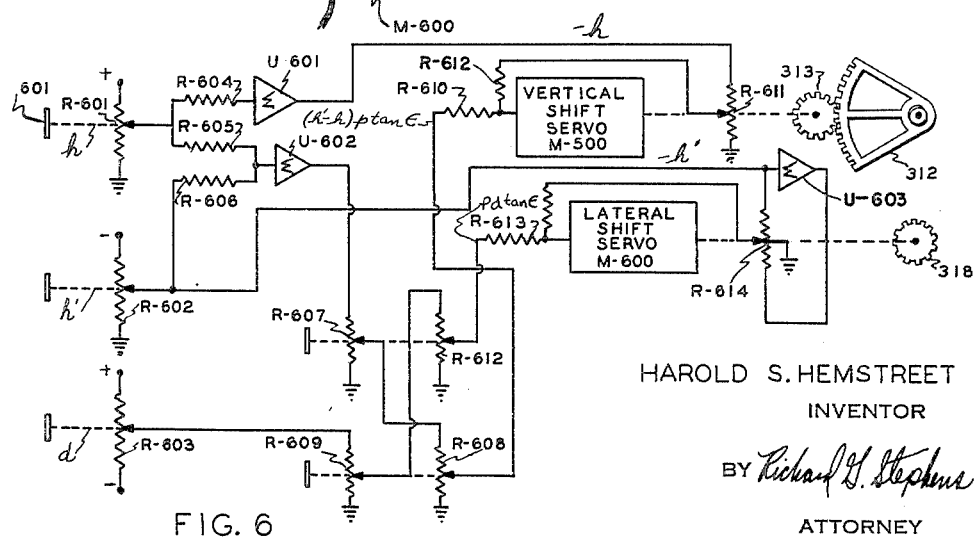
Fig. 6 is an electrical schematic diagram of an electrical servo system which may be used with the apparatus of Fig. 5 to tilt the projector, or which may be used with the apparatus of Fig. 7 to provide relative vertical and lateral movement between the projector film and the projector optics.

Referring now to Fig. 6 there is shown in electrical schematic form an exemplary form of servomechanism control for operating the shifting servomotors M–500 and M–600. Manually positioned potentiometers R–601, R–602, and R–603 may be set to positions commensurate with the effective altitude $h$ at which a film frame was taken, the altitude $h'$ of the viewpoint to be simulated, and the lateral displacement $d$ of the viewpoint from the place where the picture was taken, where $h$ and $h'$ are measured vertically as shown in Fig. 4. Servomotors M–500 and M–600 will then provide the proper vertical and lateral shifting of the projected image so as to compensate for the fact that the pictures were taken at an angle below the horizon. While the control means shown are illustrated as simple manually-positioned potentiometers, it will be apparent that the potentiometers may be automatically positioned by automatic apparatus designed to produce a visual display, such as, for example, the automatic apparatus described in my abovementioned co-pending applications, each of which illustrates apparatus particularly useful in conjunction with a grounded trainer or flight simulator for use in producing a realistic visual display of scenes viewed while taking off or landing an aircraft. In said applications servo means responsive to the path of simulated flight position the control potentiometers automatically to provide the desired vertical and lateral shifting of the projected image.

The winding of potentiometer R–601 may be connected to a constant potential from a conventional analog computer or automatic control power supply, so that movement of control knob 601 to a setting commensurate with the altitude $h_1$ at which a particular film frame was taken provides a potential commensurate in magnitude with the quantity $h$. This potential is applied as shown through resistors R–604 and R–605 to conventional feedback amplifiers U–601 and U–602. Control potentiometers R–602 and R–603 are also connected to constant potentials from the power supply, so that voltages commensurate with the values of $h'$ and $d$ are derived in their wipers. As indicated in Fig. 6, the windings of potentiometers R–601 and R–602 may be connected to power supply potentials of opposite polarity, so that the potentials applied to feedback amplifier U–602 through summing resistors R–605 and R–606 will tend to cancel each other and will provide a resultant potential input to amplifier U–602 which is proportional to the difference between altitudes $h$ and $h'$. The potential output from conventional summing amplifier U–602 is applied to excite the winding of potentiometer R–607, the arm of which may be positioned in accordance with the focal length $p$ of the projector, thereby deriving a potential proportional to the quantity $(h'-h)p$ on the wiper arm of potentiometer R–607. This potential is applied to excite the winding of potentiometer R–608, the arm of which may be positioned in accordance with the angle $\epsilon$ from the horizontal at which the particular picture to be projected was taken. It will be apparent to those skilled in the electrical arts that potentiometer R–608 (and potentiometer R–609) may comprise a linear-wound potentiometer, in which case its wiper should be set in accordance with the tangent of the angle $\epsilon$, or if a tangent function winding is provided, the control shaft of the potentiometer may be positioned in accordance with the angle itself. Thus it will be seen that a potential proportional to the quantity $(h'-h)p \tan \epsilon$ is derived on the arm of potentiometer R–608 and is applied to vertical shift servo M–500 via scaling resistor R–610. The output potential proportional to altitude $h$ is applied from feedback amplifier U–601 to excite the winding of re-balancing potentiometer R–611, the arm of which is positioned by servo M–500. The potential on the arm of potentiometer R–611 is applied via summing resistor R–612 to the input circuit of servo M–500. As will be apparent to those skilled in the art, the connections shown will cause the servo to rotate until its output shaft position represents the quotient of $(h'-h)p \tan \epsilon$ divided by $(-h)$, which, as shown above, is the amount of vertical shifting of the film plane required to place the projected image in the right location on the projection screen. Thus servomotor M–500 will shift the system optics vertically with respect to the film, as will be shown in the apparatus of Fig. 7. If the vertical shift is to be accomplished by rotation of the entire projector as shown in Fig. 5, potentiometer R–607 may be replaced by a fixed resistor, and in fact, if the same focal length optics are always used in the projector, potentiometer R–607 may be replaced by a fixed resistance for use with either vertical shifting system. The output shaft rotation of servo M–500 will be commensurate with the amount which the projector must be pitched to shift the picture vertically, and rotation of gear 313 and gear segment 312 may thusly pitch the projector the required amount.

Figure 7:
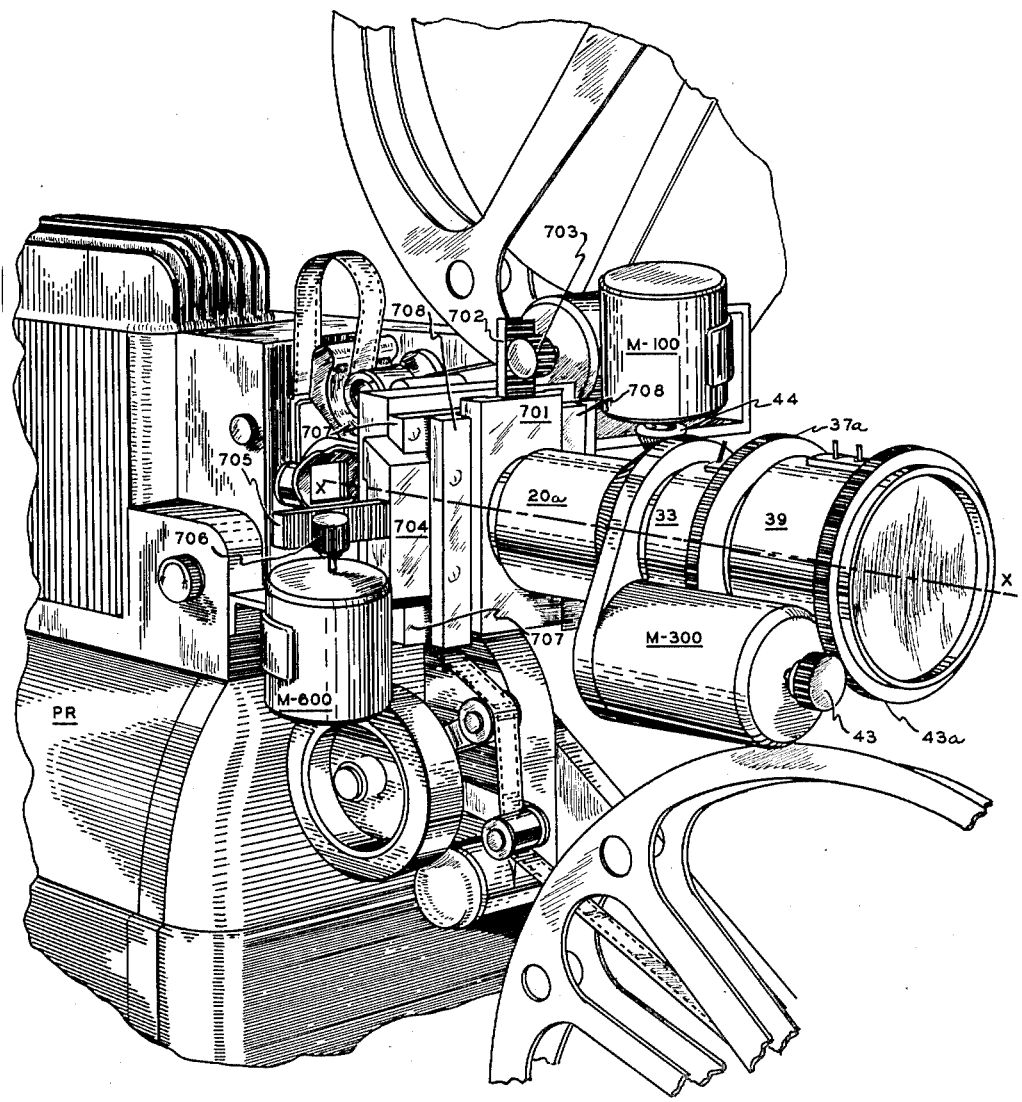
Fig. 7 is a perspective view of a mechanism by means of which a relative movement between the film and projector optics may be introduced.

The potential proportional to the lateral displacement of the viewpoint existing on the arm of potentiometer R–603 is modified in accordance with the angle $\epsilon$ from the horizontal at which the picture was taken by potentiometer R–609, further modified by potentiometer R–612 in accordance with the focal length of the projector and applied via scaling resistance R–613 to lateral shift servo M–600. If the same camera angle and projection angle is always utilized, and if the focal length of the projector is always the same, potentiometers R–609 and R–612 may be replaced by fixed resistances. Lateral shift servo M-600 is provided with a follow-up or rebalancing potentiometer R-614, the winding of which is excited at its opposite ends by potentials of opposite polarity proportional in magnitude to the altitude of the displaced viewpoint derived by potentiometer R-602. Feedback amplifier U-603 provides polarity inversion. Those skilled in the art will recognize that as a potential proportional to the quantity $pd \tan \epsilon$ is applied via resistor R-613 to the input circuit of servo M-600, that the servo will provide an output shaft position commensurate with the quotient of that quantity divided by the altitude potential $h'$ applied to excite rebalancing potentiometer R-614. The shaft of servo M-600 may shift the picture laterally by shifting the film laterally in its own plane as shown in Fig. 7, or by "yawing" the projector as shown in Fig. 5. Since the vertical rotation of the projector required to position the picture is directly proportional to the vertical shifting of the optical system required in the alternative system, and since the horizontal corrections are likewise proportional, it will be seen that the control system of Fig. 6 is applicable to either system, and the only difference between the systems would be the scaling of the servomechanisms and/or the gearing ratios between the servomotors and the shifting means. Each of the shifting servomechanisms shown may be completely conventional, and in various embodiments of the invention those skilled in the art may find it advantageous to utilize mechanical control rather than electrical. In some embodiments of the invention digital servomechanisms may be used to provide more accurate operation.

As mentioned above in connection with Fig. 4, the desired distorted picture may be correctly positioned on the screen by movement of the film vertically and horizontally within its plane relative to the projector optics and the distorting system. Since a conventional motion picture projector must be altered considerably to allow horizontal and vertical shifting of the film gate and shutter mechanism, I prefer to utilize means for shifting the projection lens and distortion system relative to the projector film gate and shutter. Shown in Fig. 7 is a conventional motion picture projector PR which may be mounted in a stationary manner. Carried on the front of the projector on the system optical axis X—X is an optical distorting system of the same type as that shown in Fig. 2, except that in Fig. 7 the toothed flanges of sleeves 33 and 39 of the variable anamorphosers are shown on opposite ends of the sleeves. Servomotor M-100 rotates pinion 44, rotating lens barrel 15, servomotor M-300 and servomotor M-200 (not shown), which latter servomotor engages toothed flange 37a to position the movable lenses of one anamorphoser in the same manner in which servomotor M-300 rotates pinion 43 and toothed flange 43a to position the movable lenses of the second anamorphoser. Servomotor M-100 is rigidly mounted to slide 701 by a bracket (not shown), so that rotation of servomotor M-100 rotates the entire optical distorting system axially. Barrel 20a is rigidly affixed to slide 701 and carries the conventional spherical projection lens 20. Slide 701 is connected to vertical rack 702 which is engaged by pinion 703, so that rotation of servomotor M-500 serves to move slide 701 and the entire optical apparatus vertically with respect to axis X—X. Slide 701 is carried in ways 708, 708, which are rigidly affixed to cross slide 704. Lateral shift servo M-600 laterally positions cross slide 704 by means of rack 705, slide 704 being carried in ways 707, 707 mounted stationary with the frame of projector PR. As lateral shift servomotor M-600 positions cross slide 704 laterally, it will be seen that the entire optical system is moved laterally relative to axis X—X. Thus the rotation of servomotors M-500 and M-600 will serve to shift the projection system optics vertically and laterally to correct the undesired picture shift obtained as a result of altering the apparent perspective of the projected image.

As shown in my abovementioned copending applications, the optical apparatus of the type described is of especial use in conjunction with grounded training equipment. When used for producing a visual display for grounded aircraft training, the projector is usually mounted as near as possible to the viewpoint of a student seated within the cockpit of a grounded aircraft trainer. As shown above and as shown in detail in my abovementioned copending applications, the alteration of the projected images is done with a presumption that the projected scene is projected from the same point relative to the screen as the observer bears to said screen, as is shown in Fig. 4. It is, of course, impossible to locate the projector apparatus inside the trainer cockpit at the same location as the student's eye, and hence the projector apparatus is usually mounted outside the trainer cockpit. Since displacement of the projection point from the student's viewpoint changes the position of the projected image on the viewing surface and thereby detracts from the realism of the observed scene, I compensate for such displacement by providing a constant displacement of the projected image in an amount commensurate with the distance of the projection point from the student's viewpoint. For example, if the projector is mounted several feet above the student's viewpoint, I compensate for such displacement either by pitching the entire projector through the small angle required to move the images downwardly, or by providing a relative vertical displacement between the projector film and projector optics to shift the projected scene downwardly. If it is desired to locate the projection point at a position laterally displaced from the student's viewpoint, a similar compensation may be made by yawing the projector slightly or by relatively displacing laterally the film object and the projector optics. Thus, the constant projector rotation or constant film shift required to compensate for displacement of the projector from the student's viewpoint are of the same nature as the varying projector rotation or varying film shift required to compensate for image shifting due to alteration of the apparent perspective of the images, and the same apparatus may be used to provide either correction. The constant correction needed to compensate for displacement of the projection point from the student's viewpoint may be provided simply by adjustment of the mid-position of travel of the compensating means. For example, if the projector is mounted a short distance above the student's eye, the projector will be pitched downward slightly even when no alteration of apparent perspective is provided and no re-location of the image on the screen is required, or in systems utilizing apparatus for providing a relative vertical shift between film and optics, the film will be shifted upwardly (downwardly in projectors which do not invert the image) a slight amount even when no re-location of the image to compensate for change in perspective is required. In other words, the mean points about which the projector is rotated or the mean points from which the optics are shifted relative to the film may be selected so as to provide a constant displacement of the projected image on the screen to compensate for the distance between the student's eye and the projection point.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. In the claims appended hereto, the phrase "altering of perspective" and modifications thereof should be interpreted in accordance with the definition given above.

Having described my invention, what I claim as new and desire to secure by Letters Patent is:

1. The method of producing a visual display of a surface area as it would appear when viewed from a selected viewpoint located at a selected altitude $h_2$ by means of an object having the appearance of said area as it would appear when viewed along a line-of-sight which makes an angle $\epsilon$ with the horizon from a reference viewpoint located at a reference altitude $h_1$ and displaced from said selected viewpoint within the plane of said selected viewpoint, said plane of said selected viewpoint comprising a plane perpendicular in two dimensions to said line-of-sight, comprising the steps of: projecting an image of said object along an optical axis toward a screen; varying the vertical magnification of said image in accordance with the vertical distance between said viewpoints; shearing said image in accordance with the horizontal distance between said viewpoints, said steps of varying the vertical magnification and shearing said image tending to displace the horizon portion of said image on said screen; and shifting said image on said screen so as to substantially satisfy the equations $$S_v = K_v \left(\frac{h_2 - h_1}{h_1}\right) \tan \epsilon$$

and $$S_h = K_h \left(\frac{d}{h_2}\right) \tan \epsilon$$

wherein $S_v$ and $S_h$ are amounts of vertical and horizontal shifting, respectively $K_v$ and $K_h$ are constants of proportionality, and $d$ is the horizontal component is said plane of said selected viewpoint of the displacement between said viewpoints, to counteract said tendency to displace said horizon portion of said image.

2. Apparatus for producing a visual display of a surface area as said area would appear when viewed obliquely from a selected viewpoint located at a selected altitude $h_2$ by means of an object having the appearance of said area as said area would appear when viewed along a line-of-sight making an angle $\epsilon$ with the horizon from a reference viewpoint located at reference altitude $h_1$ and displaced within the plane of said selected viewpoint, said plane of said selected viewpoint comprising a plane perpendicular in two dimensions to said line-of-sight, comprising: means for projecting an image of said object along a projection axis onto a viewing surface; means for altering the apparent perspective of said image, said last-named means also tending to shift horizon portions of said image on said viewing surface; and means for simultaneously redirecting said projection axis so as to shift said image on said viewing surface by respective horizontal and vertical amounts $S_h$ and $S_v$ which substantially satisfy the equations $$S_v = K_v \left(\frac{h_2 - h_1}{h_1}\right) \tan \epsilon$$

and $$S_h = K_h \left(\frac{d}{h_2}\right) \tan \epsilon$$

wherein $d$ is the horizontal component in said plane of said selected viewpoint of the displacement between said viewpoints, and $K_v$ and $K_h$ are constants of proportionality, to maintain said horizon portions of said image at a constant location on said viewing surface.

3. Apparatus for producing a perspectively correct visual display simulating a surface area as said area would appear if viewed obliquely from a selected viewpoint located at a selected altitude $h_2$ by means of an object having the appearance of said area as said area appears when viewed obliquely at an angle $\epsilon$ from the horizontal along a line-of-sight from a reference viewpoint located at a reference altitude $h_1$ and displaced from said selected viewpoint within a plane containing said selected viewpoint, said plane comprising a plane perpendicular in two dimensions to said line-of-sight, comprising: means for projecting an image of said object downwardly along an optical axis onto a viewing surface; means for altering the apparent perspective of said image, said last-named means also tending to shift horizon portions of said image on said viewing surface; and means for re-directing said axis so as to shift said image on said viewing surface by respective horizontal and vertical amounts $S_h$ and $S_v$ which substantially satisfy the equations $$S_v = K_v \left(\frac{h_2 - h_1}{h_1}\right) \tan \epsilon$$

and $$S_h = K_h \left(\frac{d}{h_2}\right) \tan \epsilon$$

wherein $d$ is the horizontal component in said plane containing said selected viewpoint of the displacement between said viewpoints, and $K_v$ and $K_h$ are constants of proportionality, to maintain said horizon portions of said image at a constant location on said viewing surface.

4. Apparatus for producing a perspectively correct visual display simulating a surface area as said area would appear when viewed obliquely from a selected viewpoint located at a selected altitude $h_2$ by means of an object having the appearance of said area as said area appears when viewed obliquely along a line-of-sight at an angle $\epsilon$ from the horizontal from a reference viewpoint located at a reference altitude $h_1$ within the plane of said selected viewpoint, said selected viewpoint being displaced from said reference viewpoint, and said plane of said selected viewpoint comprising a plane perpendicular in two dimensions to said line-of-sight, comprising: projection means for projecting an image of said object along an optical axis at the same angle $\epsilon$ from the horizontal toward a viewing surface for observation at substantially the same angle from an observer's station, the horizon portion of said object being displaced from said optical axis; means for altering the apparent perspective of said image by magnifying said image different amounts in different directions, and thereby tending to shift the horizon portion of said image on said viewing surface; and means for shifting said image bodily on said screen by respective horizontal and vertical amounts $S_h$ and $S_v$ which substantially satisfy the equations $$S_v = K_v \left(\frac{h_2 - h_1}{h_1}\right) \tan \epsilon$$

and $$S_h = K_h \left(\frac{d}{h_2}\right) \tan \epsilon$$

wherein $d$ is the horizontal component in said plane of said selected viewpoint of the displacement between said viewpoints and $K_v$ and $K_h$ are proportionality constants, thereby maintaining said horizon portion of said image at a fixed location on said viewing surface, whereby said horizon portion of said image remains at the same angle from said observer's station as said image is magnified different amounts in different directions to alter its apparent perspective.

5. Apparatus according to claim 4 in which said last named means comprises means for rotating said projection means about an axis so as to shift said image vertically on said viewing surface.

6. Apparatus according to claim 4 in which said last named means comprises means for providing a relative vertical movement between said object and said optical axis.

7. The method of producing a perspectively correct visual display simulating a surface area as said area would appear when viewed obliquely from a selected viewpoint located at a selected simulated altitude $h_2$ by means of an object having the appearance of said area as said area appears when viewed obliquely at an angle $\epsilon$ from the horizontal from a reference viewpoint located at a different altitude $h_1$, comprising the steps of: projecting an image of said object along an optical axis onto a viewing surface, the horizon portion of said object being displaced from said optical axis; altering the apparent perspective of said image by varying the magnification of said image different amounts in different directions, thereby tending to shift the horizon portion of the image projected onto the viewing surface; and shifting said image on said viewing surface by respective horizontal and vertical amounts $S_h$ and $S_v$ which substantially satisfy the equations $$S_v = K_v \left(\frac{h_2 - h_1}{h_1}\right) \tan \epsilon$$

and $$S_h = K_h \left(\frac{d}{h_2}\right) \tan \epsilon$$

wherein $K_v$ and $K_h$ are constants of proportionality and $d$ is the lateral displacement between said viewpoints, so as to counteract the tendency of said horizon portion of said projected image to be shifted as said image is magnified different amounts in different directions to alter the apparent perspective.

8. The method as set forth in claim 7 in which the last named step comprises re-directing the angle of projection so as to shift said image vertically on said viewing surface.

9. The method as set forth in claim 7 in which the last-named step comprises introducing a vertical relative movement between said object and said optical axis.

10. The method as set forth in claim 8 in which the last-named step comprises rotating the angle of projection vertically to produce said amount of vertical shifting $S_v$.

11. The method as set forth in claim 9 in which the last-named step comprises vertically moving said optical axis relative to said object in an amount to produce said amount of vertical shifting $S_v$.

12. The method of producing a perspectively correct visual display for observation from an observer's station of a surface area as said area would appear when viewed obliquely from a selected viewpoint located at a selected altitude $h_2$ and a selected lateral position by means of an object having the appearance of said area as said area appears when viewed obliquely at an angle $\epsilon$ from a reference viewpoint located at a different altitude $h_1$ and laterally displaced from said selected viewpoint, comprising the steps of: projecting an image of said object along an optical projection axis perpendicularly onto a viewing surface, said object having a horizon portion displaced from said optical projection axis; altering the apparent perspective of said image by varying the magnifications of said image different amounts in different directions and thereby tending to displace the horizon portion of said image; and laterally shifting said image on said viewing surface by an amount $S_h$ which substantially satisfies the equation $$S_h = K_h \left(\frac{d}{h_2}\right) \tan \epsilon$$

wherein $d$ is the lateral displacement between said viewpoints and $K_h$ is a constant of proportionality, to counteract the tendency of altering the apparent perspective to displace said horizon portion of said image.

13. The method as set forth in claim 7 in which the last-named step comprises re-directing the angle of projection so as to shift said image laterally on said viewing surface.

14. The method as set forth in claim 7 in which the last-named step comprises introducing a relative lateral movement between said object and said optical projection axis.

15. The method as set forth in claim 13 in which the last-named step comprises rotating the angle of projection in an amount to produce said amount of horizontal shifting $S_h$.

16. The method as set forth in claim 13 in which the last-named step comprises laterally moving said optical projection axis relative to said object in an amount to produce said amount of horizontal shifting $S_h$.

17. Apparatus for producing a visual display of a surface area as viewed downwardly from a selected viewpoint located at a selected altitude $h_2$ and a selected lateral position by means of an object having the appearance of said area as viewed downwardly at an angle $\epsilon$ from the horizontal from a reference viewpoint located at a reference altitude $h_1$ and laterally displaced within the plane of said selected viewpoint, comprising: projection means for projecting an image of said object along an optical axis at the same angle $\epsilon$ from the horizontal perpendicularly onto a viewing surface; means for altering the apparent perspective of said image; means for shifting said image vertically on said viewing surface in an amount $S_v$ and means for shifting said image laterally on said viewing surface in an amount $S_h$ so as to substantially satisfy the equations $$S_v = K_v \left(\frac{h_2 - h_1}{h_1}\right) \tan \epsilon$$

and $$S_h = K_h \left(\frac{d}{h_2}\right) \tan \epsilon$$

wherein $K_v$ and $K_h$ are constants of proportionality and $d$ is the horizontal component in said plane of said selected viewpoint of the displacement between said viewpoints.

18. The method of producing a perspectively correct visual display of a surface area as it would appear when viewed at a first angle from a selected viewpoint located at a selected altitude $h_2$ by means of an object having the appearance of said surface area as it would appear when viewed at a different angle $\epsilon$ from a reference viewpoint located at a reference altitude $h_1$, said selected viewpoint being displaced and separated from said reference viewpoint, comprising the steps of: projecting an image of said object along an optical axis, altering the apparent perspective of said image and thereby tending to shift the horizon portion of said image, and simultaneously rotating said axis so as to shift said image by respective vertical and horizontal amounts $S_h$ and $S_v$ which substantially satisfy the equations $$S_v = K_v \left(\frac{h_2 - h_1}{h_1}\right) \tan \epsilon$$

and $$S_h = K_h \left(\frac{d}{h_2}\right) \tan \epsilon$$

wherein $K_v$ and $K_h$ are constants of proportionality and points and $K_v$ and $K_h$ are constants of proportionality, to counteract the tendency of altering the apparent perspective of said image to shift the horizon portion of said image.

References Cited in the file of this patent
UNITED STATES PATENTS

| | | |
|---|---|---|
| 751,347 | Scheimpflug | Feb. 2, 1904 |
| 886,770 | De Zeng | May 5, 1908 |
| 1,283,676 | Comstock et al. | Nov. 5, 1918 |
| 1,321,906 | Gehrmann | Nov. 18, 1919 |
| 1,528,021 | Janzer | Mar. 3, 1925 |
| 1,647,631 | Ives | Nov. 1, 1927 |

(Other references on following page)

UNITED STATES PATENTS

| | | |
|---|---|---|
| 1,669,027 | Seymour | May 8, 1928 |
| 1,680,534 | Garbutt et al. | Aug. 14, 1928 |
| 1,753,222 | Timoney | Apr. 8, 1930 |
| 1,781,501 | Ford | Nov. 11, 1930 |
| 1,821,626 | Fleischer | Sept. 1, 1931 |
| 1,829,634 | Chretien | Oct. 27, 1931 |
| 1,840,799 | Waddell | Jan. 12, 1932 |
| 1,905,442 | Coors | Apr. 25, 1933 |
| 1,931,992 | Newcomer | Oct. 24, 1933 |
| 1,938,808 | Ceccarini | Dec. 12, 1933 |
| 2,023,217 | Benford | Dec. 3, 1935 |
| 2,072,286 | Wellington | Mar. 2, 1937 |
| 2,088,660 | Newcomer | Aug. 3, 1937 |
| 2,107,305 | Ogle | Feb. 8, 1938 |
| 2,280,206 | Waller et al. | Apr. 21, 1942 |
| 2,335,700 | Rogers | Nov. 30, 1943 |
| 2,337,363 | Ames | Dec. 21, 1943 |
| 2,346,074 | Hopkins | Apr. 4, 1944 |
| 2,352,101 | Hutter | June 20, 1944 |
| 2,374,981 | Cooke | May 1, 1945 |
| 2,375,634 | Dunning | May 8, 1945 |
| 2,428,399 | Timoney | Oct. 7, 1947 |
| 2,462,150 | Wilkinson | Feb. 22, 1949 |
| 2,510,080 | Cuneo | June 6, 1950 |
| 2,591,139 | Critoph | Apr. 1, 1952 |
| 2,780,141 | Luboshez | Feb. 5, 1957 |
| 2,843,015 | Luboshez | July 15, 1958 |

FOREIGN PATENTS

| | | |
|---|---|---|
| 8,512 | Great Britain | of 1898 |
| 338,962 | Great Britain | Dec. 1, 1930 |
| 354,843 | Great Britain | Aug. 17, 1931 |
| 989,739 | France | May 30, 1951 |